United States Patent
Rossbach et al.

[15] 3,694,014
[45] Sept. 26, 1972

[54] FISHING TOOLS
[72] Inventors: Donald W. Rossbach, La Grange Park; Donald E. Etes, Crystal Lake, both of Ill.
[73] Assignee: Zoo-Lab, Inc., Crystal Lake, Ill.
[22] Filed: July 9, 1971
[21] Appl. No.: 161,234

[52] U.S. Cl. ....................................289/17
[51] Int. Cl. ..................................D03j 3/00
[58] Field of Search.........................289/17

[56] References Cited

UNITED STATES PATENTS 3,101,964  8/1963  Reaser.....................289/17
3,321,225  5/1967  Miller.......................289/17
3,575,449  4/1971  Browning..................289/17
3,625,556  12/1971  Stromberg...............289/17

Primary Examiner—Louis K. Rimrodt
Attorney—Johnston, Root, O'Keeffe, Keil, Thompson & Shurtleff

[57] ABSTRACT

A fishing tool embodying a knot tier with an elongated member extending therefrom in position relative to a portion of the knit tier effective to clampingly engage a carrying member.

10 Claims, 9 Drawing Figures

PATENTED SEP 26 1972
3,694,014
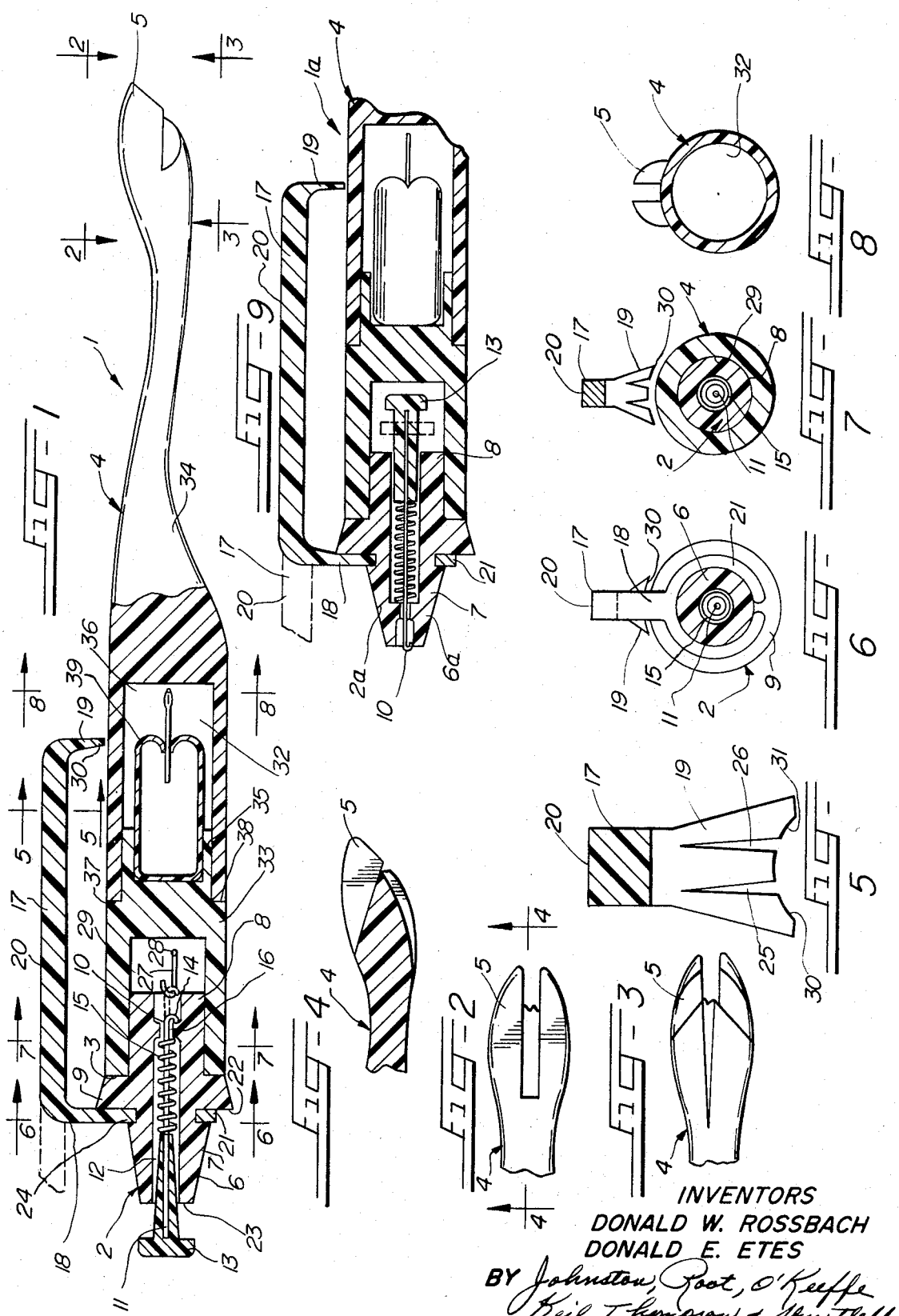
INVENTORS
DONALD W. ROSSBACH
DONALD E. ETES

FISHING TOOLS

BACKGROUND OF THE INVENTION

This invention relates to fishing tools and, more particularly, to fishing tools which are particularly well adapted to be readily carried by a fisherman.

It is a primary object of the present invention to afford a novel fishing tool.

Another object of the present invention is to afford a novel knot tier.

Knot tiers of the general type to which the present invention pertains, such as, for example, knot tiers of the type shown in U.S. Pat. No. 2,734,299, issued to R. F. Masson on Feb. 14, 1956, have been heretofore known in the art. However, such knot tiers as have been heretofore known in the art commonly have had several inherent disadvantages, such as, for example, being limited to a single use; not having sufficient buoyancy to enable them to float if dropped into the water; or being relatively difficult for a fisherman to carry on his person, and the like. It is an important object of the present invention to overcome such disadvantages.

Another object of the present invention is to afford a novel knot tier which may be readily carried by a fisherman.

Another object is to afford a novel knot tier wherein the parts thereof are constituted and arranged in a novel and expeditious manner effective to enable it to be secured to the wearing apparel of a fisherman for carrying purposes.

Yet another object of the present invention is to afford a novel fishing tool that has several practical uses.

A further object of the present invention is to afford a novel knot tier embodying parts constituted and arranged in a novel and expeditious manner effective to afford sufficient buoyancy to enable it to float if it should be dropped into the water.

Another object of the present invention is to afford a novel knot tier which may be used to carry other fishing supplies. Yet another object of the present invention is to afford a novel fishing tool which is practical and efficient in operation, and which may be readily and economically produced commercially.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a side view, partially in section and partially in elevation, of a fishing tool embodying the principles of the present invention;

FIG. 2 is a fragmentary, top plan view looking in the direction of the arrows 2—2 in FIG. 1;

FIG. 3 is a fragmentary, bottom plan view looking in the direction of the arrows 3—3 in FIG. 1;

FIG. 4 is a detail sectional view taken substantially along the line 4—4 in FIG. 2;

FIG. 5 is an enlarged detail sectional view taken substantially along the line 5—5 in FIG. 1;

FIGS. 6, 7 and 8 are detail sectional views taken substantially along the lines 6—6, 7—7 and 8—8 in FIG. 1; and FIG. 9 is a fragmentary sectional view of a modified form of the invention shown in FIG. 1.

DESCRIPTION OF THE EMBODIMENTS SHOWN HEREIN

A fishing tool 1, embodying the principles of the present invention, is shown in FIGS. 1-8 of the drawings to illustrate the presently preferred embodiment of the present invention. The fishing tool 1 embodies, in general, a know tier 2 mounted in one end 3 of an elongated member 4. The other end portion 5 of the elongated member 4 of the fishing tool 1 comprises a fishhook disgorger for removing fishhooks from fish.

The know tier 1 is of the same general type as the knot tier shown in the aforementioned R. F. Masson U.S. Pat. No. 2,734,299. It includes an elongated body member 6 which embodies two elongated end portions 7 and 8 disposed in axial alignment with each other and separated by an enlarged central portion 9, FIG. 1. A hook 10, having an elongated shank 11, is reciprocably mounted in the body member 6, with the shank 11 extending through an opening 12, which extends axially through the body member 6. A button 13 is mounted, with a press fit, on the end of the shank 11 opposite the hooked portion 14 of the hook 10. A compression coil spring 15 is mounted around the shank 11 in abutting engagement with the inner end of the button 13 and a shoulder 16 in the opening 12 to thereby yieldingly urge the hook 10 toward the left, as viewed in FIG. 1, toward engagement of the hook portion 14 with the shoulder 16.

The body member 6 and the button 13 may be made of any suitable material such as, wood, aluminum or steel. However, we prefer to make it of a suitable plastic material, such as, for example, polyethylene.

The knot tier 2 also includes a substantially U-shaped member 17, FIG. 1, having two end portions 18 and 19 projecting laterally outwardly in the same direction from an intermediate portion 20 in spaced, substantially parallel relation to each other. The U-shaped member 17 is resilient and flexible and may be made of any suitable material such as, for example, steel. However, we prefer to make it of a suitable, resilient plastic material such as, for example, polyethylene.

The end portion 18 of the U-shaped member 17 has a split loop 21 formed on the outer end portion thereof, FIGS. 1 and 6. The loop 21 is mounted in an annular recess 22 formed circumferentially around the body member 2 between the end portion 7 and the enlarged intermediate portion 9, thereof. Preferably, the end portion 7 is frusto-conical in shape, gradually increasing in size from its outer end 23 to its inner end 24. With this construction it will be seen that the loop 21 may be readily inserted over the outer end of the end portion 23 and moved therealong into the recess 22.

The end portion 19 of the U-shaped member 17, FIGS. 1 and 5, is substantially rectangular in transverse cross section and embodies two elongated slots 25 and 26 extending in spaced relation to each other from the outer end of the end portion 19 and terminating in inwardly spaced relation to the junction of the end portion 19 with the intermediate portion 20.

When the knot tier 2 is disposed in normal assembled position, the body member 2 is rotatable in the loop 21, and the U-shaped member 17 projects from the body member 2 in position to dispose the end portion 19 in outwardly space relation to the end portion 8, as shown in FIG. 1. With the aforementioned construction of the knot tier 2, and with it removed from the elongated member 4, it may be operated in a manner similar to the knot tier shown in the aforementioned Masson U.S. Pat. No. 2,734,299.

In such operation, a fishhook, such as the fishhook 27 shown in FIG. 1, to which a leader, or the like, is to be attached, may be hooked into the hook portion 14 of the hook 10, when the latter is pressed into extended position, as shown in broken lines in FIG. 1, by manual pressure applied to the button 13, and the button 13 may then be released to thereby permit the spring 15 to move the hook portion 14 back toward normal position, wherein it is effective to clamp the aforementioned fishhook 27 against the shoulder 16. The leader, or the like, not shown, which is to be attached to the fishhook 27 may be inserted through the eye 28 thereof and the two strands of the leader disposed in respective ones of the slots 25 and 26, in wedging engagement therewith, to thereby frictionally hold the strands of the leader in the slots 25 and 26. The body member 2, which is rotatably mounted in the ring 21, may then be rotated around its longitudinal axis by the operator grasping the outer periphery of the end portion 7 thereof to thereby twist the strands of the leader between the eye 28 and the end portion 19. One strand of the leader may then be withdrawn from its respective slot 25 or 26 and inserted through the innermost loop formed in the leader by the aforementioned twisting thereof. The loops in the leader may then be pulled tight against the fishhook 27 by pulling on the two strands of the leader in the same manner as described in greater detail in the aforementioned Masson U.S. Pat. No. 2,734,299.

The elongated member 4 of the fishing tool 1 has a concavity 29 extending axially thereinto from the end 3 thereof, FIG. 1. The end portion 8 of the knot tier 2 is of such size and shape that it may be removably inserted into the concavity 29, and is received therein with a relatively snug, frictional fit. If desired, threads, not shown, may be formed on the outer periphery of the end portion 8 and the inner peripheral surface of the concavity 29 to afford a threaded connection between the knot tier 2 and the elongated member 4.

The knot tier 2 and the elongated member 4 are of such size and configuration that when the knot tier 2 is disposed in the aforementioned assembled relation to the elongated member 4, the U-shaped member 17 extends along the elongated member 4 with the intermediate portion 17 disposed in outwardly spaced, substantially parallel relation thereto, and with the end portion 19 terminating at its outer end 30 in closely adjacent relation to the outer periphery of the elongated member 4. Preferably, the outer end 30 of the end portion 19 has a concavity 31 formed therein, FIG. 5, which is substantially complementary to the immediately adjacent portion of the elongated member 4.

With this construction of the fishing tool 1, when the knot tier 2 is not in use and is mounted in the aforementioned position in the cavity 29 in the handle 4, the tool 1 may readily be carried by slipping the U-shaped member 17 and the elongated member 14 into position on opposite sides of a piece of wearing apparel to thereby clamp the wearing apparel between the U-shaped member 17 and the elongated member 4. For example, the U-shaped member 17 may be slipped downwardly into a fisherman's breast pocket to thereby clampingly engage the pocket between the U-shaped member 17 and the elongated member 4, with the elongated member 4 being suspended from the pocket with the end portion 5 pointing downwardly; or the U-shaped member 17 may be slipped downwardly across the inside of the waistband of the fisherman's trousers to similarly support the tool 1 from the top of the trousers. When thus carried, the tool is protected from accidental breakage and is always readily accessible for use.

The tool 1 shown in the drawings also includes a chamber 32 in the elongated member 4. The member 4 embodies two end members 33 and 34 which are separable at one end of the chamber 32. The end 3 of the elongated member 4 is disposed at one end of the end portion 33, and a reduced end portion 35 is afforded at the other end thereof. The fish-hook disgorger 5 is disposed at one end of the end member 34, and a concavity 36 is formed in the other end portion 37 thereof. The end portion 35 on the end member 33 is of such size and shape that it may be removably inserted into the cavity 36 and fits therein with a relatively snug frictional fit. A shoulder 38 is formed on the end member 33 in position to limit the insertion of the end portion 35 into the cavity 36 so that when the end members 33 and 34 are disposed in assembled relation to each other the chamber 32 is afforded in the cavity 36.

In the preferred form of the present invention, the chamber 32 is of such size that it will afford a float chamber which is effective to insure that the fishing tool 1 will have sufficient buoyancy that it will float in water when the chamber 32 is full of air at atmospheric pressure. With this construction, the knot tier 2 and the elongated member 4 may be made of suitable materials having a specific gravity greater than one, such as, for example, metal or a suitable plastic material, such as polyethylene, while still affording a tool which will float in water.

In addition, the chamber 32 affords a storage area in which other fishing equipment such as, for example, a pump 39 of the type shown in FIG. 1, for pumping air into worms. As will be appreciated by those skilled in the art, the pump 39 is shown merely by way of illustration and not by way of limitation and the chamber 32 may be used for holding other fishing equipment, such as, for example, spare hooks, sinkers, and the like. Of course, if the chamber 32 is too heavily loaded with other fishing equipment, it will cease to afford sufficient buoyancy to assure floating of the tool 1 in the water.

In FIG. 9, a fishing tool 1a is shown which embodies the same construction as that of the tool 1 shown in FIGS. 1–8 except that the body member 6a of the knot tier 2a is a mirror image of the body member 6, the button 13 being mounted in the end portion 8 and the hook 10 being disposed in position to hold a fishhook against the outer end of the end portion 7. With this construction, when the U-shaped member 17 is disposed in knot-tying position relative to the body member 2a, it projects outwardly in the direction indicated in broken lines in FIG. 9. When a knot tying operation is completed, the loop 21 may be removed from the body member 2a and reinstalled thereon in reverse position to thereby extend the U-shaped member 17 along the elongated member 4, as shown in solid lines in FIG. 9, in the same manner that the member 17 extends along the member 4 of the fishing tool 1, as shown in FIG. 1. In this latter position of the U-shaped member 17, the fishing tool 1a may be readily attached to a piece of wearing apparel, or the like, in the same manner as heretofore discussed with respect to the fishing tool 1.

From the foregoing it will be seen that the present invention affords a novel fishing tool wherein the parts thereof are constituted and arranged in a novel and expeditious manner.

Also, it will be seen that the present invention affords a novel fishing tool which is practical and efficient in operation and which may be readily and economically produced commercially.

Thus, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:
1. A fishing tool comprising
   a. a knot tier comprising
      1. means for holding a hook including a body member having two oppositely disposed end portions, and
      2. an elongated member for holding a leader to be tied to such a hook and having
         a. one end mounted on said body member, and
         b. another end disposed in spaced relation to said body member, and
   b. another elongated member having a concavity in one end thereof,
   c. said body member being mounted in said concavity in position to dispose said other end in such position relative to said other elongated member to afford a clip for clampingly engaging a carrying member between said end portion and said other elongated member.
2. A fishing tool as defined in claim 1, and in which
   a. said first mentioned elongated member is reversible on said body member into position to dispose said other end in outwardly projecting relation relative to said other elongated member.
3. A fishing tool of a type to be carried on a piece of wearing apparel of a fisherman, said tool comprising
   a. a knot tier comprising
      1. an elongated body member
      2. means for releasably holding a hook on one end of said body member, and
      3. a substantially U-shaped member having
         a. an elongated intermediate portion, and
         b. two end portions projecting from respective ends of said intermediate portion in spaced relation to each other and in substantially the same transverse direction relative thereto,
      4. said body member being rotatably mounted in one of said end portions, and
      5. the other of said end portions having means for releasably holding a leader to be attached to such a hook, and
   b. an elongated member having a concavity in one end thereof,
   c. said body member being removably mounted in said concavity in position to dispose
      1. said intermediate portion in outwardly spaced, substantially parallel relation to said elongated member, and
      2. said other end portion in facing relation to said elongated member in position to clampingly engage such a piece of wearing apparel between said other end portion and said elongated member.
4. A fishing tool as defined in claim 3, and in which
   a. said one end portion is reversible on said body member to dispose said U-shaped member in position to project outwardly from said body member in the opposite direction.
5. A fishing tool as defined in claim 3, and in which
   a. said U-shaped member is mounted on said body member in such position that said intermediate portion projects outwardly from said one end of said body member.
6. A fishing tool as defined in claim 5, and in which
   a. said elongated member
      1. has a hollow intermediate portion, and
      2. is separable at said last mentioned intermediate portion.
7. A fishing tool as defined in claim 5, and in which
   a. said elongated member comprises a fish-hook disgorger.
8. A fishing tool as defined in claim 5, and in which
   a. said U-shaped member is resilient and flexible around the juncture between said intermediate portion and said one end portion for yieldingly clamping such a piece of wearing apparel between said other end portion and said elongated member.
9. A fishing tool as defined in claim 3, and in which
   a. said one end of said body member is removably mounted in said concavity, and
   b. said U-shaped member is resilient and flexible between said one end portion and said other end portion to thereby yieldingly hold said other end portion against movement away from said elongated member.
10. A fishing tool as defined in claim 3, and in which
    a. said elongated member has a float chamber therein of sufficient size to insure said knot tier and elongated member will float in water when said float chamber is filled with air.

* * * * *